United States Patent [19]

Queffeulou et al.

[11] 3,801,747

[45] Apr. 2, 1974

[54] SPEECH DETECTOR FOR PCM-TASI SYSTEM

[76] Inventors: Jean-Yves Queffeulou, route de Ploubezre, Lannion; Gerard C. Vautrin, route de Kerbiriou, Perros-Guirec, both of France

[22] Filed: Oct. 18, 1972

[21] Appl. No.: 298,531

[30] Foreign Application Priority Data

Oct. 19, 1071 France .............................. 71.37562

[52] U.S. Cl. .............................................. 179/15 AS

[51] Int. Cl. .............................................. H04j 5/00

[58] Field of Search .......... 179/15 AS, 18 BC, 1 CN

[56] References Cited

UNITED STATES PATENTS

| | | | |
|---|---|---|---|
| 2,958,733 | 11/1960 | Dickieson | 179/15 AS |
| 3,508,007 | 4/1970 | Goodall | 179/18 BC |
| 3,706,091 | 12/1972 | May | 179/15 AS |
| 3,712,959 | 1/1973 | Fariello | 179/15 AS |
| 3,649,766 | 3/1972 | LaMarche | 179/15 AS |
| 3,644,680 | 2/1972 | Amano | 179/15 AS |

*Primary Examiner*—Kathleen H. Claffy
*Assistant Examiner*—David L. Stewart

[57] ABSTRACT

Speech detector for a communication system transmitting and receiving pulse code modulation PCM signals in time slots on a time division basis, which are connectable and disconnectable on a time assignment speech interpolation basis to and from trunks. The speech detector comprises means for forming with the digits of the PCM signals significant digits equal to the PCM signals digits or to selected combinations of these digits and defining transmission amplitude thresholds and reception amplitude thresholds. The transmission threshold which is selected depends on the reception amplitude threshold. Means are provided for sequentially detecting in each time slot the selected significant digit of the transmitted PCM signals and for deriving therefrom speech slot pulses and no-speech or silent slot pulses. The speech slot pulses are counted during a first predetermined period and the silent slot pulses are counted during a second predetermined period. Control signals for the connection and disconnection of the slots to and from the trunks are derived from the counts.

3 Claims, 3 Drawing Figures

SPEECH DETECTOR FOR PCM-TASI SYSTEM

The present invention concerns a speech detector for a Time Assignment Speech Interpolation system in which all the signals are expressed in PCM coded form and on time division basis. Such a transmission system is called in the art a PCM-TASI system. threshold:

PCM-TASI systems are known from the communication made by K. AMANO and C. OTA "Digital TASI System in PCM transmission" at the Boulder International Communications Conference in June 1969, pages 34–23 to 34–28 of the proceedings of this conference. In the system proposed in this paper the speech detector operates on a time division basis in conjunction with speech detector memory. The numer of words in the speech detector memory is equal to the number of input trunks and each word has an appropriate number of bits which are partitioned to represent active or pause status, to detect speech and to generate connection and disconnection signals. Further, the detector has two kinds of threshold : one is an amplitude threshold and the other is a duration threshold. The speech is detected whenever the difference between the number of samples above the amplitude threshold and the number of samples below or equal to the amplitude threshold reaches the value defined by the duration threshold.

This previously proposed system consists of two identical items of apparatus situated at the ends of a bilateral multiplexing telephone connection. The part scheduled for transmission is equipped with a speech detector arranged for permanent sequential detection on each of the input trunks and, when one of these trunks has been detected as being active, the logical part of the apparatus undertakes a free line search whose address is fed to the reception apparatus through a special line in such manner as to establish the normal connection. Once the circuit has become passive, which circumstance is established by means of the speech detector, the connection is interrupted by analogous operations.

The organisation of the connection networks is modelled on that of the time-sharing telephone switching networks, whereas that of the transmission lines is identical to that of the digital transmission lines.

Two parts a logic part and a processor can be identified in the speech detector, whose construction is the object of the invention, in which the first part comprises as many logic devices as there are time slots in the multiplexer and the input concentrator. These logic devices have the function of correspondingly determining the slots in which the slot signal exceeds or is exceeded by a transmission threshold which can take several values while taking into account the signal routed through the return time slot. This signal consists of noise or speech whose level exceeds or is exceeded by a reception threshold. The threshold in the transmission slot depends of the relative level of the signal or the noise in the reception slot with respect to the reception threshold. These precautions prevent the sole presence of signals induced in the transmission slot by the signals or the noise existing in the reception slot from establishing connections.

The speech signals being PCM coded groups, the detection of their amplitude with respect to a threshold is obtained by the detection of particular code digits in the coded groups or of particular linear combinations of said digits by means of logic circuits.

To take the mean value of the analog signal in the trunk, in particular if this analog signal is a low-frequency signal for which several consecutive coded samples have values close to each other, which exceed the transmission threshold or does not, a number $p$ of the coded samples is compared with the threshold before deciding whether a signal does or does not represent an useful speech signal. This number $p$ is selected as a function of the components of the speech spectrum possessing the greatest energy, in such manner that the new frequency of the samples as regards threshold comparison which is equal to the recurrence frequency divided by p should lie, with a satisfactory degree of probability, among those of these components. For example, the frames of the multiplexer are of 125 $\mu$ s and the recurrence frequency of the slots is 8 kHz. If the coded signals in a given slot is compared with the transmission threshold eight consecutive time before deciding that the result of the comparison is valid, the decision frequency is 1 kHz although the comparison frequency is 8 kHz.

The second part or processor of the detector sequentially processes the observations gleaned from the trunks whilst making allowance for the time constants enforced for a correct sensitisation of the circuits having the task of connecting and disconnecting the trunks to the slots. The processor has two periods: a complete period which is the time necessary for processing the threshold comparison results of all the trunks and a unitary period which is the time necessary for processing the threshold comparison result of one trunk. The unitary period is divided into sub-unitary periods corresponding to an elementary step of process. For reasons which will appear later on, the sub-unitary period duration is equal to the slot duration and the number of sub-unitary periods in a unitary period is equal to the number p above referred to.

For example, the complete period is 1 ms, the unitary period is 3.9 $\mu$s and the slot duration and the sub-unitary period are 0.49 $\mu$s.

The detector is arranged for controlling the circuits connecting the trunks to and disconnecting the trunks from the slots in three cases only:

1. Trunk passing from the passive state to the active state. This passage is confirmed only if, in the course of N complete periods during each of which the signal in a given slot has been compared p times to the transmission threshold, at least one signal among the $p$ signals has exceeded the selected transmission threshold, this event following a silent period having the duration T. This last condition is introduced to prevent connection of an already connected circuit. In the present case the detector delivers a connection order called first transfer signal having the circuit for controlling connection and disconnections as its destination.
2. Holding a trunk activated since a time T in this state for a period T'.
3. Passage of a trunk from the active state to the passive state when a silent period is detected threin and lasts longer than T. The detector reports this to the connection and disconnection control circuit and initiates a disconnection procedure in which a distinction must be drawn between two cases:

the disconnection may be immediate if the trunk engagement had been shorter than T, and the disconnection is delayed until the instant T' if T had been exceeded by this engagement.

The conditions 2 and 3 rise to a second transfer signal, characterised in that the trunk has been kept in the same state for the period T at least.

The state of a given trunk is compared to its state during the preceding complete period. If the two states are the same, a pulse is applied to a first counter and if the two states are different the first counter is reset. When the first counter counts 4, the same state has lasted 4 ms and a flipflop called $A_1$ in the following is positioned on 1 or 0 according to whether the state which has lasted 4 ms is speech or pause. The state of flipflop $A_1$ at the preceding complete period is maintained in a flipflop called $A_1'$ in the following. If the two states of $A_1$ and $A_1'$ are different a second counter is reset and if the two states are the same each overflow pulse of the first counter (i.e. each time the first counter counts 8) triggers the second counter. When the second counter reaches the count 32, a flipflop called B in the followed is triggered. Thus, when a speech period of 4 ms ($A_1 = 1$; $A_1' = 0$) follows a silence period of 32 ms ($B = 1$) a connection order or first transfer signal is sent to the connection and disconnection control circuit. Control circuits for connecting or disconnecting trunks to the slots of a time division switching system are known in the art and do not pertain to the invention. In fact the state of flipflop B is transferred at the following complete period to a mate flipflop B' and it is the conditions $$A_1 = 1 \ ; \ A_1' = 0 \ ; \ B' = 1$$

which gives rise to the first transfer signal.

The comparison between the PCM signals and the thresholds are made by detecting the binary value 1 or 0 of selected digits or of selected digit linear combinations of the PCM signals after compression. For example assuming that the PCM signals comprise a sign bit and six bits ABCXYZ the comparison with the first threshold depends on the value of binary digit A and the comparison with the second threshold depends on the value of binary digit (A+B+C). The selection between the first or second threshold depends of the binary digit (A+BC) of the return PCM signal.

As already said the PCM signals are logarithmically compressed signals and the thresholds correspond to digit or digit combinations of the compressed PCM signals. This improves the signal to noise ratio of the communication.

This advantage may be demonstrated by considering a sample having an amplitude S which is small compared to the acceptable maximum signal, whereon is superimposed a noise of r.m.s. amplitude B which defines a ratio R= S/B characterising the quality of the communication.

If the transmission device has a compression coder employing a logarithmic compression characteristic, the new amplitude after coding will amount to:

$S_c = b(1 + \text{Log } aS)$ $a$ and $b$ being constants derived from the compression rule. The slope of the compression curve at the abscissa determined by the sample amplitude is $\Delta S_c/\Delta S = b/S$. The r.m.s. noise amplitude changes to $B_c = B\ b/S$ and after compression, the signal/noise ratio amounts to $$R_c = (1 + \text{Log } aS)S \ / \ B = (1 + \text{Log } aS)S \ , \text{ when } B = 1$$

demonstrating that Rc is considerably greater than R, given that S is greater than $1/a$.

The invention will now be described in more detail, by way of example only, with reference to the accompanying drawings, wherein FIG. 1 is an illustration in the form of a block diagram of a PCM TASI switching system in which a speech detector according to the invention is inserted;

Figure 1:
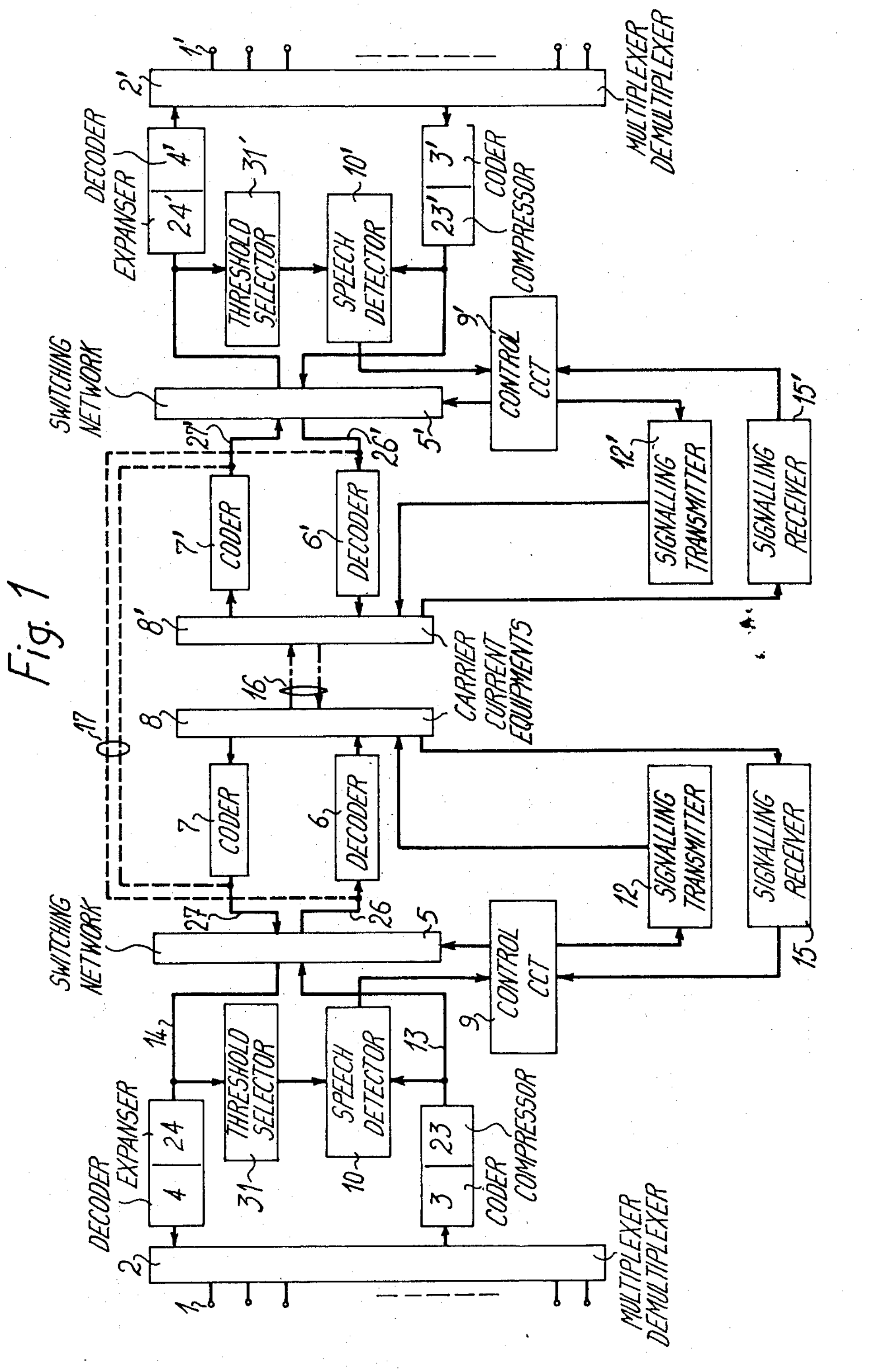

Terminal equipments of a TASI switching system have been illustrated in FIG. 1. The two terminal equipments are indentical and their component circuits are marked by the like reference numerals, the numerals being primed for one set and not for the other. Consequently, one of the equipments only will be described in detail.

A plurality of subscriber's lines or of trunks 1 (it will be assumed hereinafter that they are trunks), of which there are 256, is connected to a multiplexer-demultiplexer 2 which may equally play the part of a concentrator when the number of time slots of the multiplexer-demultiplexer is smaller than the number of trunks. The analog signals emanating from the trunks are smpled as PAM signals in the multiplexer 2 and the samples are converted into coded pulse groups, that is to say into PCM signals, in the coder 3 before being compressed in the compressor 23 and finally fed to the switching network 5 through the group transmit highway 13. In the other direction of transmission, the compressed PCM signals emerging from the switching network 5 through the group receive highway 14 are expanded in the expandor 24, decoded into PAM signals in the decoder 24 and converted into analog signals in the demultiplexer 2.

The group transmit highway 13 and the group receive highway 14 are correspondingly connected to the speech detector 10 and to a threshold selector 31. The speech detector is connected to a control circuit 9 which is itself connected to the switching network 5. At the output side of connection network 5 is situated a group transmit highway 26 as well as a group receive highway 27 which are correspondingly connected to a "PCM to analog" decoder 6 and to an "analog to PCM" coder 7, themselves connected to a carrier current apparatus 8.

The carrier current apparatus 8 is connected to the carrier current apparatus 8' by means of two-wire or four-wire transmission lines 16 of which there are a smaller number than the number of subscriber's lines or of trunks 1 or 1'. For example, there are 256 trunks 1 and 128 transmission lines 16. A signalling transmitter circuit 12 and a signalling receiver circuit 15 connect the control circuit 9 to the carrier current apparatus 8. These circuits comprise modulators-demodulators and are arranged to transmit and receive orders for connection and disconnection and the numbers of the lines to be connected or disconnected to and from the far end of the transmission line as it is known in conventional TASI systems.

The first transfer signal and the second transfer signal, which have been disclosed in the introductory part, are fed to the control circuit 9 by the speech detectors 10 and 10'.

In FIG. 1, it has been assumed that the transmissions between the two equipments 8 and 8' were performed by means of analog carrier current signals. The transmission may however equally take place in the form of PCM signals, either on a time-sharing line 17, or by means of a multi-access satellite. The coders 7 and 7', the decoders 6 and 6' and the carrier current devices 8 and 8' may be omitted in this case.

It is assumed that the multiplexers-demultiplexers 2 and 2' do not perform a concentrating action, i.e. that there are as many slots in the multiplex highways as trunks connected to the multiplexers-demultiplexers. The time is divided into complete processing periods of 1 ms and each processing period of 1 ms is divided into 256 unitary processing periods of 1ms/256 = 3.9 $\mu$s which are designated $\theta_o$ to $\theta_{255}$.

The time division frame has a 125 $\mu$s duration and it is divided into 256 slots of 125 $\mu$s/256 = 0.49 $\mu$s, which are designated $\tau_o$ to $\tau_{255}$. Each unitary processing period $\theta$ contains eight processing sub-unitary periods $t_o - t_7$.

A processing sub-unitary period $t_k$ ($k = 0, 1, \ldots 7$) of unitary period $\theta_{32m+j}$ ($m = 1, 2, \ldots 7$ and $j = 0, 1, \ldots 31$) coincides in time with slot $\tau_i$ ($i = 1, 2, \ldots 255$) where $i$ is given by the relation $$i = 8j + k$$

The following table shows the time division rule as regards processing ($\theta$ and $t$) and as regards multiplexing ($\tau$).

| Processing unitary period | Processing sub-unitary period | Slot |
|---|---|---|
| $\theta_{32+j}$ | $t_k$ | $\tau_i$ |
| $m=0$ $j=0$ $\theta_o$ | $t_o$ | $\tau_o$ |
| | $t_1$ | $\tau_1$ |
| | $t_7$ | $\tau_7$ |
| $m=0$ $j=31$ $\theta_{31}$ | $t_o$ | $\tau_{248}$ |
| | $t_1$ | $\tau_{249}$ |
| | $t_7$ | $\tau_{255}$ |
| $m=1$ $j=0$ $\theta_{32}$ | $t_o$ | $\tau_o$ |
| | $t_1$ | $\tau_1$ |
| | $t_7$ | $\tau_7$ |
| $m=1$ $j=31$ $\theta_{63}$ | $t_o$ | $\tau_{248}$ |
| | $t_1$ | $\tau_{249}$ |
| | $t_7$ | $\tau_{255}$ |
| $m=7$ $j=0$ $\theta_{224}$ | $t_o$ | $\tau_o$ |
| | $t_1$ | $\tau_1$ |
| | $t_7$ | $\tau_7$ |
| $m=7$ $j=31$ $\theta_{255}$ | $t_o$ | $\tau_{248}$ |
| | $t_1$ | $\tau_{249}$ |
| | $t_7$ | $\tau_{255}$ |

As usual, the signals picked-up from the slots for processing by the speech detector are logarithmically compressed in compressor 23 which may be written down in binary notation $$\text{SABCXYZ} \qquad (1)$$

in which S is a sign bit and ABCXYZ are code bits having respectively binary weights from five to zero. Although the logarithmic compressor type is immaterial as far as the invention is concerned, the compressor specified in the U.S. Patent application Ser. No. 855,881 filed Sept. 8, 1969 in the name of Robert Mauduech is particularly appropriate. The expanded signal is given by the formula:

$$S\,[10\,]^{ABC-q} \times q\,XYZ \qquad (2)$$

in which [10] is the number 2 in binary notation and $q$ the Boolean quantity (A + B + C) which, as will be seen later on, is used as a level for one of the two thresholds.

Figure 2:
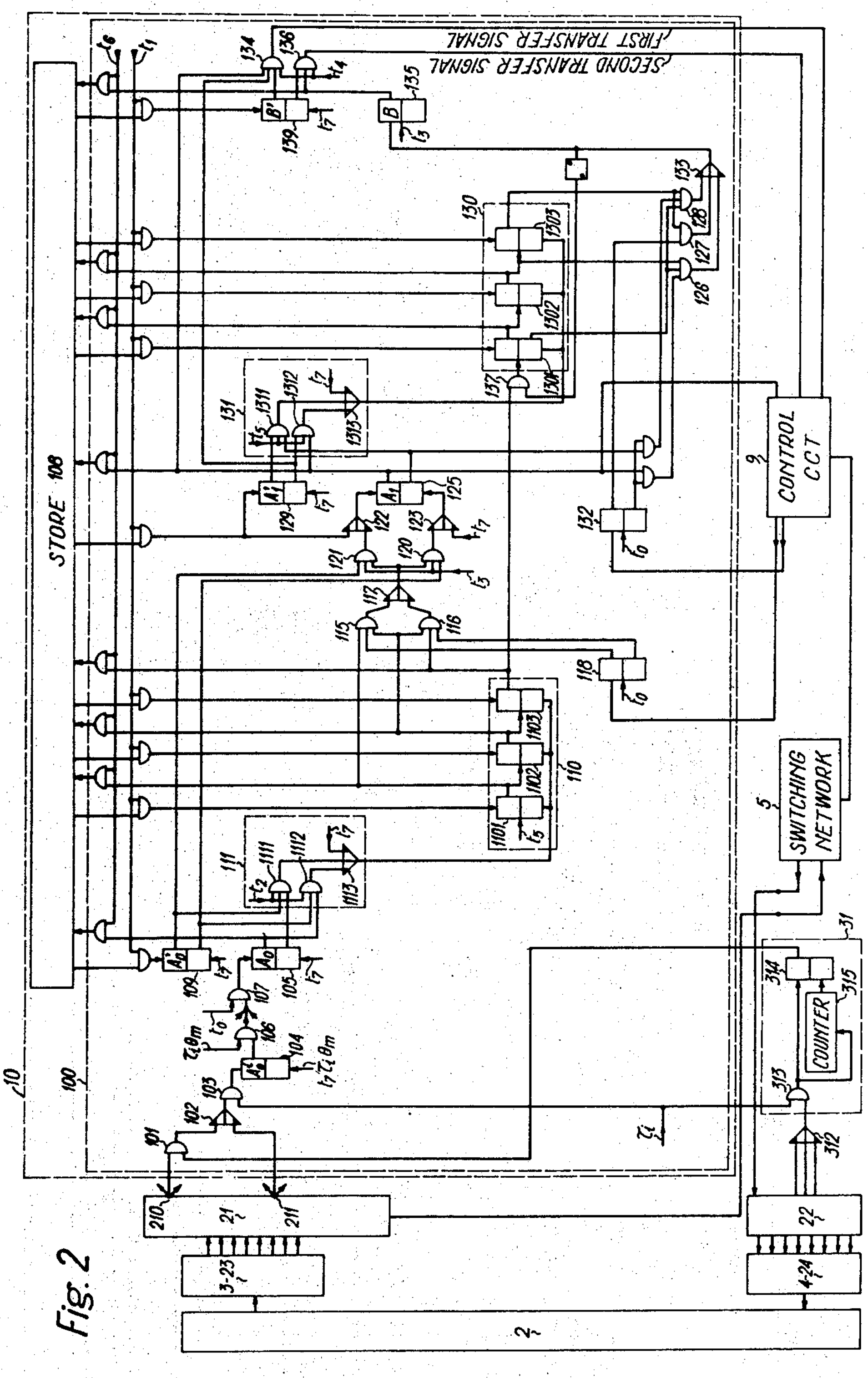
FIG. 2 is a detailed logical diagram of the speech detector.

Referring now to FIG. 2, the coder-compressor 3–23 and the expander-decoder 4–24 are once more shown in this figure. The digits SABCXYZ are available in parallel on the seven output leads of the coder-compresor 3–23 and they are applied to circuit 21. Circuit 21 is a separator circuit which connect the second output lead of circuit 3–23 conveying digit A to output terminal 210 and the second, third and fourth outut leads conveying respectively the digits A, B, C to an OR-gate not shown whose output is connected to terminal 211. Therefore, one finds the digit A on output 210 and the digit (A+B+C) on output 211.

The pulses or digits A (low sensitivity) and the pulses or digits (A+B+C) (high sensitivity) are fed in parallel to a plurality of 256 temporary memory circuits. Each of these circuits comprises an AND-gate 101 having an input connected to terminal 210, an OR-gate 102 having its two inputs respectively connected to the output of AND-gate 101, and to terminal 211, an AND-gate 103 having one input connected to the output of OR-gate 102 and a flipflop 104 ($A_o^i$) connected to the output of AND-gate 103. The second input of AND-gate 101 is connected to the threshold selector 31 and the second input of AND-gate 103 is connected to a time base generator not represented from which it receives selected pulses among the timing pulses defining the slots. In a whole period of 1 ms, there are eight frames of 125 $\mu$s. The timing pulses relative to a given slot, say the slot No. 0 are applied to AND gate 103 at seven consecutive times, namely at the times $\theta_o\ t_o$, $\theta_{32}\ t_o$, $\theta_{64}\ t_o$, $\theta_{96}\ t_o$, $\theta_{128}\ t_o$, $\theta_{160}\ t_o$ and $\theta_{192}\ t_o$. At said times, the digits of the coded samples, A or (A + B + C) according to whether the high sensitivity mode or the low sensitivity mode is in operation, is entered into flipflop $A_o$. At the time $\theta_{224}\ t_o$, flipflop $A_o^o$ is reset. In order to make quite clear the operation of the temporary memory circuits, another example is given concerning slot N°i. Flipflop $A_o^i$ will be operated (either to receive a one or a zero) at the seven times $\theta_{32m+j}\ t_k$ where $m = 0, 1, \ldots 6$, $j$ is the integer part of the quotient of the division of i by 8 and k is the remainder of the division. Flipflop $A_o^i$ will be reset at the time $\theta_{32m+j}\ t_k$ with $m$=7 .

Example:

$$i = 133 = 8j + k = 8 \times 16 + 5$$

whence:

$$j = 16 \quad k = 5$$

The flipflop will be operated at the times $\theta_{16}t_5$, $\theta_{48}t_5$, $\theta_{80}t_5$, $\theta_{112}t_5$, $\theta_{144}t_5$, $\theta_{176}t_5$ and $\theta_{208}t_5$ and it will be reset at the time $\theta_{240}t_5$.

The information temporarily stored in the 256 flipflops 104 ($A_o^i$) is transferred sequentially into the single flipflop 105 ($A_o$) through AND-gates 106 and 107. The transfer recurrence period is 1 ms for a given flipflop $A_o^i$. The transfer time for the flipflop $A_o^i$ is taken between the operating times and the reset time of the period, say at half-distance. For example $A_o^o$ is operated for the last time at $\theta_{192}t_o$ and reset at $\theta_{224}t_o$; its contents can be transferred into $A_o$ at the time $\theta_{208}$ $t_o$; $A_o^{133}$ is operated for the last time at $\theta_{208}$ $t_5$ and reset at $\theta_{240}$ $t_5$; its contents will be transferred into $A_o$ at the time $\theta_{224}$ $t_o$ (and not $\theta_{224}$ $t_5$). With this timing the processing of each slot begins at the sub-unitary period $t_o$ of each unitary period $\theta_o$ to $\theta_{255}$.

The sensitivity changeover is performed by the threshold selector 31 which, through the OR 312 and AND 313 gates, receives the incoming compressed coded signal groups. More precisely the separator circuit 24 separates the digits A, B, and C of the received PCM signals and makes the product BC in an AND-gate which it contains and which is not represented. OR-gate 312 makes the sum A+BC. The gates 313 are unblocked synchronously with the gates 103 and yield access to flipflops such as 314 which unblock the coordinated gates 101 of the incoming trunk. The signal issuing from the AND gate 313 operates the zero reset of the counter 315 counting up to 255 and which is stepswitched by means of timing pulses at the frequency of the time slots. At the end of one millisecond, the "overflow" signal of the counter operates the zero reset of the flipflop 315 if no other signal has been received on the return line during this interval.

The active state detected on the trunks 1 and which has been transferred to the flipflop 105 of the processing unit 100 can be stored in the store 108 through gates open at time $t_6$. The store 108 comprises as many words as there are circuits connected to the multiplexer-demultiplexer or, in case of concentration, as many words as there are time slots in this multiplexer-demultiplexer.

The state of the flipflop $A_o$ which is operated at $t_o$ is transferred into the flipflop $A_o'$ through the store 108. This state is first transferred from flipflop $A_o$ to store 108 through one of the AND-gates giving access to store 108 and which are triggered at $t_6$ and then from store 108 to flipflop $A_o'$ through one of the AND-gates controlling the outputs from store 108 and which are triggered at time $t_1$. This transfer is made to ascertain whether the actuel state of a given trunk as marked by the state of $A_o$ is identical or dissimilar to the state of the same trunk during the preceding processing unitary period as marked by the state of $A_o'$. In the case of dissimilarity, the counter 110 comprising three flipflops 1101, 1102, 1103 is reset to zero at $t_2$ by the comparator 111 formed by the AND-gates 1111 and 1112 and by the OR-gates 1113. It results that in the case of dissimilarity of the state of one trunk during respectively two successive processing unitary periods, the counting of the complete periods of 1 ms is re-initiated. The counter 110 is set at $t_1$ by the store 108 in which the contents of $A_o$ have been stored in $t_6$; it is contingently erased during $t_2$ in the case of dissimilarity of the states of the same slot during two successive processing unitary periods, contingently increased by one unit during $t_5$ in the case of similarity and systematically cancelled during $t_7$.

It has been observed that, every millisecond, the state of the 256 slots is transferred from 104 (information $A_o^i$) to 105 (information $A_o$) during $t_o$, then stored in the store 108 during $t_6$ for transfer during $t_1$ into the flipflop 109 (information $A_o'$). The consecutive states which are identical are counted in the counter 110 until they reach the value N.

The overflows of the counter 110 are counted in a counter 130 formed by the flipflops 1301, 1302, 1303. The number N which can be smaller that the capacity of counter 110 is decoded by the AND-gates 115 and 116 and the OR-gate 117. By connecting to these AND-gates selected output terminals of one or more of the flipflops of the counter 110, these AND-gates are unblocked at the instant in which the counter reaches one of two predetermined counts. The selection between these two counts is performed by the flipflop 118 which controls the unblocking of one of the AND gates 115 and 116 whilst blocking the other.

The AND gates 120 and 121 and the OR gate 122 serve the purpose of transferring the state of the flipflop 109 ($A_o'$) into the flipflop 125 (information $A_1$) at the time $t_3$ after the counter 110 has counted N milliseconds. This transfer means that during N milliseconds, the slot No. i has remained in the same state, irrespective of this very state one or zero. The state of the flipflop 125 ($A_1$) is stored in the store 108 during $t_6$ for transfer during $t_1$ into the flipflop 129 ($A_1'$).

The information $A_1$ present during the slot $\tau_i$ evidences the retention of one and the same state on the trunk $i$ during N milliseconds. If $A_1 = 0$, the trunk has remained silent for N milliseconds; if $A_1 = 1$, the trunk has been active or speechifier for N milliseconds.

The state of the flipflop 125 ($A_1$) inscribed during $t_3$ is compared to the state of the flipflop 129 ($A_1'$) inscribed during $t_1$ by transfer from the store 108 in order to detect any change in the state of the trunk after being kept in a given state during a predetermined period. This comparison is performed by the comparator 131 formed by the AND-gates 1311 and 1312 and by the OR-gate 1313, and identical to the comparator 111. In the case of dissimilarity, the counter 130 comprising three flipflops 1301,1302,1303 is reset to zero during $t_5$ and, in this case, the flipflop 135 (B) remains in the zero state.

The eventual overflow signal of the counter 130 is fed through the AND-gates 126,127,128 and the OR-gate 133 to the flipflop 135 (B) to bring the same into state one. The state of the flipflop 135 (B) is memorised at the instant $t_6$ in store 108 and transferred at the instant $t_1$ of the following processing unitary period into the flipflop 139 (B')

The states $A_1$, $A_1'$, B, B', as well as their complements $\overline{A_1}$, $\overline{A_1'}$, $\overline{B}$, $\overline{B'}$, are the data needed for the generation of the first transfer signal and the second transfer signal and for their transmission to the control circuit 9.

When a speech period of N milliseconds ($A_1 = 1$; $A_1' = 0$) follows a silent period of a duration at least equal to $T(B' = 1)$, the coincidence of the states $$A_1, \overline{A_1'} \text{ and } B'$$

occurs during $t_4$ in the AND gate 134. This condition produces the first transfer signal which is transmitted to the control circuit 9. At this instant, the control circuit should naturally be ready to receive this transfer signal. To this end, the control cicruit 9 has an access sytem which does not form part of the invention and has not been illustrated.

The counter 130 totals the overflows of the counter 110 until it undergoes an overflow in its turn, thereby indicating that the trunk N°i had remained in the same state for T milliseconds and the stepping of the counter is inhibited by a signal fed to the AND gate 137, which receives the same from the inverter 138 and from the OR gate 133. As has been perceived, this overflow causes the flipflop 135(B) to be placed in the state 1 and, in these circumstances, delivers the command $B\overline{B}'= 1$ through the AND gate 136, which has been referred to as the second transfer signal and which is transmitted to the control circuit 9.

The control circuit 9 incorporates all the elements required for generation of all the connection and disconnection commands. The reception in control circuit 9 of the first transfer signal is interpreted by this control circuit as a demand for connection of a circuit whose address is supplied at the same time.

The reception of the second transfer signal informs the control circuit 9 that no change in state has occurred in the circuit since T = 32 milliseconds and that it is apt to envisage two eventualities:

a. — $A_1 = 1$ the circuit has been engaged for T milliseconds, the hold period is changed to T′ milliseconds;

b. — $A_1 - 0$ the circuit has been disengaged for T milliseconds, the control circuit may perform its disconnection either immediately, if there is no free slot and a circuit requires a connection, or upon termination of T′—T or say 224 milliseconds, if the hold period has raised to T′ = 256 milliseconds.

Figure 3:
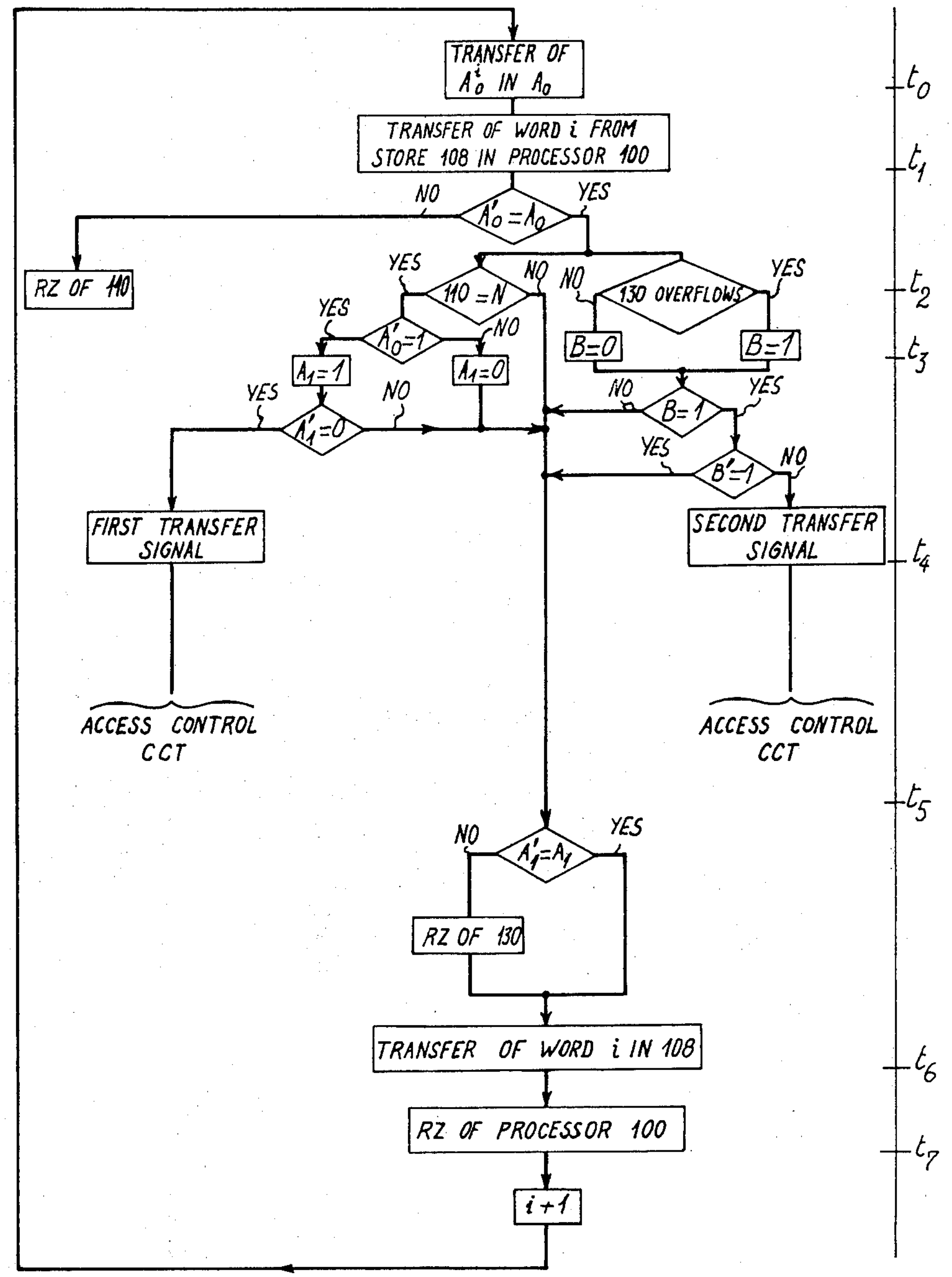
FIG. 3 is the diagram of the program of the speech detector shown in FIG. 2.

The course followed by the operations performed by the detector during the processing of a slot No. *i* is shown in FIG. 3. This diagram summarises the matter apparent from the foregoing and specifies the conditions which could be fulfilled by the different functions in the course of a cycle of 1 ms. This cycle begins with $t_o$, by a transfer of the information $A_o{}^i$ into $A_o$; this is followed by the transfer into the processing unit 100 of the word stored in the store 108, during $t_1$; by the comparison between $A_o'$ and $A_o$ during $t_2$; by the taking into account of the contents of the counters 110 and 130 and of the function B, during $t_3$; and finally by the transmission of the command signals, during $t_4$.

Although the invention has been described for the case in which there are no more than two thresholds for the transmitted signals selected by a single threshold of the received signals, it is obvious to one versed in the art that it is possible to widen the application of the inventive detector to the case in which there would be $q$ thresholds for the received signals and $(q + 1)$ thresholds for the transmitted signals.

What we claim is:

1. A speech detector for a communication system transmitting and receiving pulse code modulation PCM signals in time slots on a time-division basis, said slots being connectable and disconnectable on a time assignment speech interpolation basis to and from trunks, comprising means for forming selected combinations of binary digits of the transmitted and of the received PCM signals comprising respectively first level digits characterizing the level of said transmitted PCM signals and second level digits characterizing the level of said received PCM signals; means for sequentially selecting a particular time slot of a recurrent sequence of time slots containing said first level digits; means deriving from said selected time slots first slot pulses whenever a signal level exceeding a predetermined threshold occurs and second slot pulses corresponding to the amount by which said signal level exceeds said threshold; means for determining the level of said threshold in dependence on the second level digits; means for counting with a given recurrence period the first slot pulses during a first predetermined period and the second slot pulses during a second predetermined period; and means for deriving from said counting means control signals for the connection and disconnection of said slots to and from said trunks.

2. A speech detector for a communication system transmitting and receiving pulse code modulation PCM signals in time-slots on a time-division basis, said slots being connectable and disconnectable on a time assignment speech interpolation basis to and from trunks, comprising means for forming selected combinations of binary digits of the transmitted and of the received PCM signals comprising respectively first level digits characterizing the level of the transmitted PCM signals and second level digits characterizing the level of said received PCM signals; means for sequentially detecting said selected first level digits during a particular time slot of a recurrent sequence of time slots and in a predetermined number of occurences of said particular time slot said threshold; means for determining the level of said threshold in dependence on the second level digits; means for counting with a given recurrence period the first slot pulses during a first predetermined period and the second slot pulses during a second predetermined period; and means for deriving from said counting means control signals for the connection and disconnection of said slots to and from said trunks.

3. A speech detector for a communication system transmitting and receiving pulse code modulation PCM signals in time slots on a time-division basis, said slots being connectable and disconnectable on a time assignment speech interpolation basis to and from trunks, comprising a time base generator defining time slots, on the one hand for a unitary period for processing the comparison of a signal level in a trunk of the communication system with a predetermined threshold level, and on the other hand for a complete period or complete cycle for sequentially processing the comparison of signal levels in all the trunks of the communication system with said threshold; means for forming selected combination of binary digits of the transmitted and of the received PCM signals comprising respectively first level digits characterizing the level of said transmitted signals and second level digits characterizing the level of said received signals; means for selecting first level digits in dependence on the reception amplitude level; a plurality of flipflops respectively associated with the time slots; means for sequentially storing said selected first level digits in given one of said flipflops, during a predetermined number of associated recurrent time slots and at the rate of the unitary cycles, a second flipflop; means for succesively transfering at the rate of the unitary cycles the digits stored in the first flipflops into the second flipflop; processing means for deriving from the digits stored in said second flipflop first slot pulses whenever a signal level exceeding said predetermined threshold occurs and second slot pulses corresponding to the amount by which said signal level exceeds said threshold; means for counting at the rate of the complete cycle the said fist slot pulses during a first predetermined period and the said second slot pulses during a second predetermined period; and means for deriving from said counting means control signals for the connection and disconnection of said slots to and from said trunks.

* * * * *